United States Patent [19]

Speirs et al.

[11] Patent Number: 5,422,135

[45] Date of Patent: Jun. 6, 1995

[54] PROCESS FOR PREPARING A GELLED FOOD PRODUCT SHEET

[75] Inventors: Charles Speirs, Ruthland; John Malin, Northants, Great Britain

[73] Assignee: Nadreph Limited, Berkshire, England

[21] Appl. No.: 231,891

[22] Filed: Apr. 22, 1994

Related U.S. Application Data

[63] Continuation of Ser. No. 87,023, Jul. 2, 1993, abandoned, which is a continuation of Ser. No. 773,962, Nov. 12, 1991, abandoned.

[30] Foreign Application Priority Data

May 17, 1990 [GB] United Kingdom ............... 8911300

[51] Int. Cl.⁶ ................. A23L 1/05; A23L 1/314
[52] U.S. Cl. ................... 426/574; 426/513; 426/517; 426/575; 426/576
[58] Field of Search ............ 426/272, 573, 574, 575, 426/576, 646, 512, 513, 517

[56] References Cited

U.S. PATENT DOCUMENTS

| | | | |
|---|---|---|---|
| 2,563,996 | 8/1951 | Edgar et al. | 426/573 |
| 4,239,785 | 12/1980 | Roth | 426/513 X |
| 4,337,627 | 7/1982 | Roth | 426/517 X |
| 4,347,261 | 8/1982 | Challen et al. | 426/573 |
| 4,427,704 | 1/1984 | Cheney et al. | 426/573 X |
| 4,450,183 | 11/1984 | Steinberg et al. | 426/513 X |
| 4,735,817 | 4/1988 | Smith | 426/517 |
| 4,868,002 | 9/1989 | Seaglione et al. | 426/513 X |
| 4,880,654 | 11/1989 | Okada | 426/574 |
| 4,897,278 | 1/1990 | Schubbring et al. | 426/646 X |
| 5,071,665 | 12/1991 | Buckley et al. | 426/646 X |

FOREIGN PATENT DOCUMENTS

| | | | |
|---|---|---|---|
| 0050006 | 4/1982 | European Pat. Off. | |
| 0328349 | 8/1989 | European Pat. Off. | |
| 3248692 | 7/1983 | Germany | |
| 3728155 | 12/1987 | Germany | |
| 1432278 | 4/1976 | United Kingdom | 426/513 |
| 2170092 | 7/1986 | United Kingdom | 426/573 |
| 1472021 | 4/1989 | U.S.S.R. | 426/513 |

*Primary Examiner*—Arthur L. Corbin
*Attorney, Agent, or Firm*—Curtis, Morris & Safford

[57] ABSTRACT

A gelled sheet of food product is prepared by passing a wet dough of edible substance, such as meat or meat by-product, having food value and comprising a gellable substance, such as sodium alginate, onto a rotating roller to form a sheet and initiating gelation of the gellable material, for example, in the case of sodium alginate, by spraying the material with calcium ions. The sheet can subsequently be processed, for example by being folded and cut to form chunks, which may be useful in a petfood product.

13 Claims, No Drawings

PROCESS FOR PREPARING A GELLED FOOD PRODUCT SHEET

This application is a continuation of application Ser. No. 08/087,023, filed Jul. 2, 1993, now abandoned, which is a continuation of Ser. No. 07/773,962, filed Nov. 12, 1991, now abandoned.

FIELD OF THE INVENTION

This invention relates to a process for the preparation of a gelled sheet or portion of a sheet of food product.

BACKGROUND OF THE INVENTION

Various processes for preparing meat analogues from generally vegetable protein sources have been proposed in the past. U.S. Pat. No. 2,682,466, U.S. Pat. No. 2,802,737, U.S. Pat. No. 2,830,902 and U.S. Pat. No. 3,142,571 are examples of proposals for preparing meat analogues from such protein sources as soy bean isolate and peanut protein isolate. Another example is GB-A-1418778, which discloses the preparation of a meat analogue starting from a dry mix of proteins, starches and/or gums. All the above processes may be regarded as examples of meat analogue generation.

Roll-refining is a process which is known for producing proteinaceous food products. GB-A-1432278 describes the roll-refining largely of non-meat proteins, although one of its examples, instead of starting with soya protein or casein, begins with "ground meat", soya protein, water and other additives and another of its examples begins with "ground meat", water, casein rennet and other additives.

Co-pending European application number 89301176.7 describes the roll-refining of a wet dough of a mammalian and/or avian meat protein, at least part of which protein is functionally inert.

These techniques, however, are directed in the above application to using a wet dough of starting material, which on roll-refining is intrinsically capable of forming a cohesive sheet.

GB-A-2170092 describes a method of producing foodstuffs which comprises a plurality of pieces comprised of comminuted material, each piece having an outer gelled skin, characterised by the steps of forming at least one slurry of a first type comprising a gellable material, forming at least one slurry of a second type comprising a soluble gelling activator which will interact with the said gellable material to effect gellation of the said gellable material, bringing together said at least one slurry of a first type and said at least one slurry of a second type to form randomly shaped pieces of one of said slurry types in a matrix of the other of said slurry types, each of said randomly shaped pieces being encapsulated within a gel skin formed by interaction of said gelling activator with said gellable material at the surfaces of said randomly shaped pieces concurrently with said bringing together of said slurries of said first and second types, at least one of said slurry types also comprising a comminuted edible material having food value. The method may be used to make simulated meat and fruit products.

SUMMARY OF THE INVENTION

The present inventors have now found that the benefits obtained by roll-refining, such as texturisation of the product, can be obtained even when using a wet dough of starting material which is not intrinsically capable of forming a cohesive sheet by known roll-refining processes.

DESCRIPTION OF CERTAIN PREFERRED EMBODIMENTS

According to the present invention there is provided a process for the preparation of a gelled sheet or portion of a sheet of food product comprising passing a wet dough of edible substance having food value and comprising a gellable material onto a rotating roller to form a sheet and initiating gelation of the gellable material.

In the present context, the term "gellable material" is to be taken as meaning a gelling agent. Generally the gelling agent comprises polysaccharide, but may comprise an agent of another origin such as gelatine.

The sheet of food product has at least one dimension, and preferably two dimensions of at least 3 cm, preferably at least 10 cm, most preferably at least 100 cm or 1 m or more in length. The term "product" refers to the material having passed between the rollers.

The gelled sheet or portion of a sheet may be partially or substantially completely gelled. The sheet or portion of a sheet preferably has an outer gelled skin, which can partially or substantially extend over the outer surface of the sheet or portion of a sheet.

In some cases, the gelation of the sheet or portion of a sheet extends to beneath the outer gelled skin to the interior of the sheet or portion of a sheet.

The amount of gellable material is preferably in the range from 0.1 to 25% by weight of the food product on dry solids, preferably 1 to 10%, and typically about 5%.

It will be noted that the initial dough of edible substance is wet. Generally speaking, the dough may contain from 15 to 95% water. Often, the dough will contain from 20 to 70% water.

The product may contain from 15 to 95% water, which is similar in water content to the wet dough, and preferably contains from 20 to 70% water.

The edible substance may be any type of edible substance, but is preferably a comminuted edible material. The edible material may, for example, comprise comminuted fruit or meat.

The edible substance having food value may comprise one or more of carbohydrate, protein and/or fat. Typically where the edible substance comprises protein, the protein will comprise offal and/or muscle meat.

A particularly favoured edible substance comprises meat protein. The term "meat" includes meat and/or meat by-products.

The term "meat and meat by-products" includes animal organs, smooth muscle, skeletal and/or heart muscle and connective tissue. Preferred examples of these categories of meat and meat by-products include treated animal carcass products, such as pork skin and greaves, internal organs such as liver and minced meats, for example prepared from skeletal muscle. It has been found that powdered meat meal is also a suitable form of treated protein. The term meat meal includes meat and bone meal.

The wet mass may additionally include flavour and/or texture enhancing agents. Fat is preferably present in the initial wet mass in a small proportion, typically 5 to 30%, more typically 20 to 25%.

The wet dough can be passed onto a single rotating roller.

Alternatively the dough can be passed onto a plurality of rotating rollers.

In a preferred aspect, the dough is passed between a pair of oppositely rotating rollers.

The term "roll-refined" refers to material which has been passed between a pair of oppositely rotating rollers.

The roller velocity is not considered to be crucial, and will generally be at a velocity compatible with formation of a sheet.

Where the dough is passed between a pair of oppositely rotating rollers, the rollers will generally bear one on the other and be urged together by a force, which may typically range from 10 to 1000 psi ($7 \times 10^3$ to $7 \times 10^5$ kg/m$^2$). Preferred pressures are within the range of from 250 to 750 psi ($1.8 \times 10^5$ to $5.3 \times 10^5$ kg/m$^2$) and may be in the order of 500 psi ($3.5 \times 10^5$ kg/m$^2$). The surface velocity of one roller may be greater than the surface velocity of the other roller at the point where the two rollers bear on each other. This may be achieved either by having one roller rotating at a faster speed than the other, or by having rollers of different diameter, or by a combination of these factors. When the mass of meat or meat by-product being processed is fed between two rollers whose surface velocities are different, the tendency is for the sheet or film of food product being formed to stretch and for the sheet or film to tend to form on, or be transferred to, the faster roller.

It will be appreciated that it is possible to have more than two rollers. It can be seen that n rollers can be arranged to co-operate in n-1 pairs. For example, three rollers can be arranged as two co-operating pairs with the middle roller being common to the first pair and the second pair. It is preferred for the rollers successively encountered by the food product being formed to have successively increasing surface velocities, for imparting stretch, in the manner described above, to the product being formed, and for transferring the product being formed from one roller to another. The surface velocities may increase at a ratio of, for example, from 1.5 to 2.5 between successive rollers.

The roller temperature is not believed to be critical in some embodiments, and the temperature of the dough on the roller may range for example from 4° to 95° C.; it is only necessary that the roller temperature be kept such that the overall process is workable. Typically, the product on the rollers may be kept about 40° C. There may be some advantages in keeping the roller substantially above room temperature, so that the temperature of the protein on the roller is in the range, for example from 40° to 80° C., in that it may be possible during processing partially to cook the food product being formed, or to reduce the bacterial count of the food.

The present invention does not, however, depend upon heat coagulation of heat coagulable proteins to form a sheet.

Thus, it has been found to be advantageous in some embodiments to use heated rollers or to apply heat to the food product when it is on or after it leaves the rollers. This is particularly beneficial when the edible substance comprises protein and when some of the protein has not been cooked or otherwise treated prior to being passed between the rollers, and where it is desired that the protein be cooked.

Where a heated roller is used, the temperature of the dough on the roller will preferably be greater than 50° C., more preferably greater than 70° C., and still more preferably greater than 80° C. The dough on the roller will generally be less than 200° C. preferably less than 95° C. It is particularly preferred that the dough on the first roller which the dough contacts is at a temperature of less than 50° C., while a subsequent roller is heated. This is believed to stretch and shear the dough on the first roller and to set the product on the subsequent roller.

The roller may be heated by passing a hot fluid, such as hot water, or where temperatures greater than 100° C. are required, hot oil or super-heated steam through the roller.

In other embodiments it has been found advantageous to use a cooled roller. Suitably the last roller may be cooled to effect setting on the roller. Where a cooled roller is used the temperature of the dough on one roller will generally be less than 15° C., preferably less than 10° C. and more preferably less than 5° C.

The profile of the roller may be smooth. Alternatively, it is possible for the surface of the roller to be formed with protrusions and/or indentations, for example, in the form of corrugations. This may impart desirable qualities of texture to the food product being formed.

The food product may be removed from the roller or any of the rollers in any appropriate manner. It has been found convenient to use a doctor blade effectively to scrape the product off the last roller to which the food product being formed has been transferred. The doctor blade will generally lie parallel to a longitudinal axis of the last roller and bear on the surface of the roller, generally being inclined towards the source of the food product being formed. A suitable pressure for the doctor blade will readily be ascertainable by one skilled in the art; it may range from a very light pressure (such as a few, eg. 5, kg/m$^2$) up to pressures that compare with or are higher than pressures exerted between two rollers. As an example, the doctor blade may bear against the last roller at a pressure in the order of 250 psi ($1.8 \times 10^5$ kg/m$^2$). Collecting the food product by means of a doctor blade results in the food product being collected in a sheet-like form. It will be appreciated that the sheet may be allowed to form to a relatively large area, or may be chopped, cut, torn or otherwise reduced in size (laterally and/or longitudinally) as it emerges from the rollers.

The gelation of the gellable material may, for example, be initiated by reducing the temperature of the gellable material, and/or by a gelling activator.

In some embodiments of the present invention gelation is initiated by reduction of the temperature of the gellable material. In these embodiments, gelation is generally thermoreversible though not necessarily exclusively so. Suitable thermoreversible gelling materials include agar, gelatin, carageenan and furcellaran. The thermoreversible gelling material may be in the form of a solution in the wet dough, the wet dough preferably being hot. Wet dough will be at a temperature at which the gelling material is in solution prior to the reduction of the temperature. The reduction of the temperature will be sufficient to gel the gelling material. A reduction in temperature may be effected by the use of a cooled roller. Preferably where more than one roller is used, the last roller is cooled.

In other embodiments of the present invention, or in addition to reduction in temperature of the gellable material, the gelation of the gellable material is preferably initiated by a gelling activator capable of activating the gellable material. In these embodiments, gelation is substantially thermo-irreversible but can be thermoreversible, and the gelling material will generally be a charged polyelectrolyte.

Any suitable non-toxic gellable material/gelling activator combinations may be used. Suitable gellable materials include non-toxic soluble alkali metal alginate salts or for example, non-toxic alkali metal salts of pectic acid, especially the sodium salt. Preferably a sodium salt may be used as the soluble gellable material. This is preferably used in combination with soluble calcium salts as a gelling activator preferably a readily soluble calcium salt such as calcium chloride as the gelling activator. Where the gellable material is a pectic acid or a salt thereof, and the gelling activator is a calcium salt, a roller is preferably cooled to assist gellation. Preferably, the last roller is cooled to effect gelling on the roller.

Kappa carrageenan salts are other suitable gellable materials, especially sodium kappa carrageenan. The gellable material may comprise some potassium ions. Carageenan gels have a melting point and a setting point which is dependent on the concentration of potassium ions. At low concentrations of potassium ions, carageenan gels have a low melting point and setting point but with increasing concentration of potassium ions the carageenan gel melting point and setting points increase. The desired effects of potassium ions are to initiate gelation of certain carageenan and to raise the melting and setting temperatures of carageenan gels. Carageenan gellable materials are preferably used in combination with soluble potassium salts as a gelling activator, preferably a readily soluble potassium salt such as potassium chloride.

Both synthetic materials and naturally occurring or extracted materials may be used as the gellable material.

The gelling activator is preferably a non-toxic salt of a polyvalent cation which cation reacts with the soluble gellable material to form a gel. More preferably, the cation is a divalent cation, such as calcium. In some aspects, it is preferred that the salt is a soluble salt, suitable salts being, for example calcium chloride or calcium citrate.

By the term "soluble salt" is meant a salt which dissolves to the extent of more than 0.5 g of salt in 100 g of distilled water at 25° C.

In one aspect of the present invention, initiation of the gelation of the gellable material by the gelling activator is effected by contacting the activator with the sheet comprising gelling material having left the roller. Preferably, the gelling activator comprises a non-toxic soluble salt of a polyvalent cation.

Contacting is typically achieved by spraying the sheet having left the roller with a solution comprising the gelling activator. Alternatively, contacting may, for example, be achieved by passing the sheet into a controlled sequestrant bath containing the activator.

The strength of the solution comprising the gelling activator is preferably from 0.02% to 50% weight per volume.

In a second aspect, the wet dough may comprise the gellable material and a gelling activator. The gelling activator is preferably in an amount of from 0.1 to 20%, typically from 1 to 15% by weight in the final product. Substantial gellation of the material by the activator is initiated by an initiator. The initiator may be a chemical initiator or a physical initiator.

In one feature of this aspect, the wet dough comprises a gelling activator which is a substantially insoluble salt or a sparingly soluble salt of a cation, which, if solubilised, would react with the soluble gellable material. Gelation may be initiated by contacting the sheet with an initiator comprising a solubilising agent for the cation of the insoluble salt or sparingly soluble salt. Contacting may be achieved by spraying of the sheet having left the roller with a solution comprising the solubilising agent. The solubilising agent is preferably a non-toxic acid. Particularly suitable initiators are citric acid and/or acetic acid. For example, the wet dough may comprise as the gellable material a soluble alginate, such as sodium alginate together with an anhydrous dicalcium phosphate as the insoluble salt, and citric acid as a solubilising agent.

In another feature of this aspect, the wet dough further comprises a retarding agent, which retards gelation of the gellable material and the gel activator. The retarding agent is preferably present in an amount from 0.01 to 15%, more preferably from 0.02 to 10% by weight of the final product.

Suitable retarding agents include ion-chelators which chelate the gel activator, such as sodium tripolyphosphate, phosphoric acid, citric acid, ethylenediamine tetraacetic acid, sodium hexametaphosphate, tetrasodium pyrophosphate and sodium citrate.

In this feature, the gel activator is preferably a sparingly soluble salt. The gelation may be initiated by adding an initiator to the mixture, where a chemical initiator is used, a particularly suitable initiator is gluconodelta lactone.

In addition to or alternatively to the use of a chemical initiator a physical initiator such as heat may be used to release the activator from the chelator. Frictional heat from interaction of the dough with the roller may be sufficient to release the activator. The wet dough preferably comprises a non-toxic viscosity enhancing agent to improve handling on the roller or rollers. Suitable viscosity enhancing agents include gums such as guar, xanthan, and methyl cellulose.

The wet dough in certain circumstances may comprise heat-settable proteins. Suitable heat-settable proteins include meat proteins, including myosin and albumen, vital gluten and soya.

The gelled sheet or portion of a sheet may be further treated. It may, for example, be cut into chunks or into whatever form is desired.

The sheet may be subjected to further processing, for example: (a) folding the sheet to form a layered structure; (b) baking the sheet to form a biscuit-like structure; and/or (c) setting the sheet in a gel-like matrix.

Often the sheet will be allowed to fold onto itself, and this may form the requisite layered structure described under (a) above. This can provide the product with additional texturisation in addition to texturisation due to the passing of the wet dough onto the rotating roller. The weight of the sheet itself may be sufficient to give sufficient density to the layered structure, but pressure may alternatively be applied to increase the density of the structure. The pressure will generally be in the order of from 0.1 to 2 atmospheres ($1 \times 10^4$ to $2.1 \times 10^5$ kg/m$^2$), for example in the order of 1 atmosphere ($1 \times 10^5$ kg/m$^2$). All pressures are gauged pressures. The addition of such pressure may be conveniently effected in a mould. The layered structure may be cut into chunks, simulating the appearance of cubes of meat. The chunks may subsequently be cooked, for example in a can (and/or in gravy).

Alternatively or additionally, the sheet may be taken from the final or downstream roller and baked to form a biscuit-like structure as described under (b) above. Baking will generally be carried out above 100° C., for example at a temperature of from 100° to 250° C. Baking temperatures of 150° to 200° C. are typical. Baking may conveniently be done in an oven, which in a continuous process will be located downstream of the final or downstream roller.

Further in the alternative or additionally, the sheet may be set in a gel-like matrix. Before so setting, the sheet can be shredded or dried, depending on the desired effect to be achieved.

The food product may be set in a gel-like matrix by causing it to come into contact with (for example by immersion) a fluid capable of forming a gel-like matrix. The fluid may consist of known gelable meat mixtures known in the art, such as blood, comminuted meats and offal and fat mixtures as used in sausages and meat puddings. Such systems are believed to depend on the denaturation and gelation of proteins to effect texturisation through the addition of salts and/or the application of heat. The fluid may also contain, either as well as or instead of the above ingredients, plant gums or mucilages, which will in general contribute to the texture of the medium. Where desirable for reasons of product aesthetics, the fluid can have a portion or all of the animal protein replaced by vegetable proteins such as soy or wheat gluten. Where the food product comprises a heat irreversible gelling system such as alginate incorporation of this into such a fluid capable of forming a gel-like matrix will result in a final texture with heterogenous strands within the gel-like matrix resembling, for example, gristle.

If however, the sheet is comprised of a gelling system which is heat-reversible and this is incorporated into a fluid capable of forming a gel-like matrix, then upon heating as the heat-settable proteins coagulate, the thermoreversible gelled sheets will melt, leaving an imprint of their shape from the coagulated proteinaceous structure.

Typically, therefore, the composition of the fluid can therefore comprise from 0.1 to 30%, eg. 5 to 15% protein, with the residue being water, fats, flavours, colours, gums and/or thickeners, and cofactors for each or any of them. Protein may alternatively be absent, in which case a different gelling agent, such as a carbohydrate gelling agent, is used. Food product obtained either directly or indirectly from the rollers can be added, typically at a level of from 5 to 10%, to the fluid, after which the combined system is used to set, for example by inducing gelation and/or thickening. The precise method of setting is not important and will depend on the functional properties of such gelling and/or thickening agents as are present. For example, proteinaceous agents such as albumins or caseins may be heat set, while plant gums such as alginates and pectates may be gelled with calcium or other (generally divalent) metal salts, or hot carrageenan solutions merely left to gel on cooling.

The effect of setting the product initially obtained as a sheet will be to provide striations and fracture points within a comparatively amorphous gel. It is then possible, once the gel has set, to break it in irregular pieces or chunks, and a meat-like appearance will be evident in many cases. The pieces or chunks may subsequently be cooked, for example in a can (and/or in gravy).

Depending on their moisture content (which can subsequently be increased or decreased as desired), products produced by a process in accordance with the invention can either be used on their own or as incorporated ingredients in human or animal foodstuffs, and in particular in petfoods.

It will be appreciated that the further processing of the sheet may include all permutations and combinations of each and any of variants (a), (b) and (c).

The invention also extends to cover products of a process or processes as described above.

The invention will now be described with reference to the following examples.

EXAMPLE 1

A meat emulsion was prepared from 50.63 g minced offal meats and 14.24 g of water using a high speed mixer. To this emulsion was added with rapid mixing a gravy containing 1.01 g of sodium alginate, 2 g of guar, 1.55 g of caramel and 32.57 g of water. The material was finally mixed and passed through a series of rollers. After collection by the doctor blade the sheet was sprayed with a 15% $CaCl_2$ solution. The sheet could then be formed into chunks or shredded and processed to give meat pieces in a pet food type product.

EXAMPLE 2

Poultry necks (750 g) were emulsified and mixed with 250 g of a 4% sodium alginate solution. To this mixture was added 200 g of finely ground dried bovine epidermis, the mixture was applied to the rolls as in Example 1.

EXAMPLE 3

Use of a single roll:

The emulsified poultry necks, sodium alginate and dried bovine epidermis mix of example 2 was applied onto the surface of a revolving drum. The coated material was removed by a doctor blade and sprayed with 15% $CaCl_2$ solution. Processing of the material was as described in Example 1.

EXAMPLE 4

A meat offal blend was prepared containing pig heart (20%), chicken offal (20%), beef tripes (20%), turkey viscera (20%) and lamb kidneys (20%). To 800 g of this blend was added 200 g of a 4% sodium alginate solution and the mixture passed through a high speed emulsifier (Blend A).

A suspension (Blend B) of calcium sulphate was then made using guar gum as a viscosity enhancing agent. The slurry had the following compositions:

|  | % by weight |
| --- | --- |
| Calcium sulphate | 5.4 |
| Guar gum | 1.0 |
| Water | 93.6 |

Twenty parts of Blend B were then passed through a high speed emulsifier with 80 parts of Blend A. A resultant material was then applied to the roll forming apparatus and a rippled sheet removed from the doctor blade. A spray of citric acid was applied to the sheet. The sheet was left for one hour before slicing and processing in a pet food product.

EXAMPLE 5

Alkaline treated dried orange peel was used as discussed in GB-A-1508993. This was used in formed meat pieces in the following manner:

Formulation:

| | |
|---|---|
| Treated peel | 1.6% |
| Water | 31.7% |
| Sodium tripolyphosphate | 0.2% |
| Non-fibrous meat offcuts | 63.3% |
| Dye solution | 1.3% |
| Caramel | 1.9% |

The sodium tripolyphosphate, dye and caramel were dissolved in the water which had been raised to boiling point. Treated peel was added with vigorous stirring and the solution was intimately mixed with the non-fibrous meat.

To each 100 g of this mixture was added 7 g of dried bovine epidermis and an intimate mix achieved. This mixture was passed onto a triple roller mill where all the roll temperatures were 10° C. After being removed from the final roll by a doctor blade the rippled sheet was passed into a 10% calcium chloride solution and allowed to stand for one hour. The firm sheet was removed and cut into any aesthetically desirable shape or size. The pieces were then washed in water and autoclaved in cans at 24 psi (170 kNm$^{-2}$) for one hour in the presence of minced meats. After being cooled the contents of the can were examined and the formed meat pieces were found to have the firmness and texture of stewed beef.

EXAMPLE 6

The process of Example 1 was followed except that instead of sodium alginate being used sodium pectate was used. A similar product was obtained off the doctor blade.

EXAMPLE 7

The process of Example 1 was followed except that minced white fish was used instead of offal meats.

EXAMPLE 8

The process of Example 1 was followed except that minced beef was used instead of offal meats.

EXAMPLE 9

The process of Example 1 was followed except that comminuted fruit pieces were used instead of meats.

EXAMPLE 10

Ground poultry carcasses (980 g) were gently agitated in a HOBART Mixer. To the meat was added 10 g of alginate powder, e.g. PROTANAL SF 120, and mixing continued until the powder was evenly dispersed. Calcium carbonate (5 g) was evenly dispersed in this mixture followed by 5 g of glucono-delta lactone. The final mixture was stored at 4° C. before applying to the roller. The residence time on the roll and the roll temperatures were adjusted so that the material clearing the final roll was 60° C. A rippled sheet was formed with an excellent meat-like appearance. This was included in canned meat product. (The words HOBART and PROTANAL are trade marks.)

EXAMPLE 11

Poultry necks (750 g) were emulsified and mixed with 250 g of a 4% sodium Kappa carrageenan solution. To this mixture was added 200 g of finely ground dried bovine epidermis. The mixture was applied to the rolls at 25° C. The ripple was collected off the doctor blade and immersed in a solution of 5% potassium chloride for 60 minutes. A sheet of meat-like appearance was collected after this period which can be processed in canned pet food or other canned meat applications.

We claim:

1. A process for the preparation of a gelled sheet or portion of a sheet of food product comprising passing a wet edible dough containing a gelling agent onto a rotating roller to form a sheet and then initiating gelation of the gelling agent to form the gelled sheet.

2. A process as claimed in claim 1, wherein the amount of gelling agent is present in the range from 1 to 10% by weight of the food product on dry solids.

3. A process as claimed in claim 1, wherein the edible dough comprises comminuted fruit and/or meat.

4. A process as claimed in claim 1, wherein the edible dough comprises meat and/or meat by-products.

5. A process as claimed in claim 1, wherein the wet dough is passed onto a single rotating roller.

6. A process as claimed in claim 1, wherein the dough is passed between a pair of oppositely rotating rollers.

7. A process as claimed in claim 1, wherein the gelation of the gelling agent is initiated by reducing the temperature of the gelling agent.

8. A process as claimed in claim 7, wherein the gelling agent comprises agar, gelatin, carrageenan and/or furcellaran.

9. A process as claimed in claim 1, wherein gelation of the gelling agent is initiated by a gelling activator capable of activating the gelling agent.

10. A process as claimed in claim 9, wherein the gelling agent is a charged polyelectrolyte and the gelling activator is a source of di- or poly-valent ions.

11. A process as claimed in claim 9, wherein the gelling agent is a kappa carrageenan salt and the gelling activator is a source of potassium ions.

12. A process as claimed in claim 9, wherein the gelling activator is brought into contact with the gelling agent by spraying or immersion.

13. A process as claimed in claim 1, wherein the sheet so formed is subjected to further processing comprising (a) folding the sheet to form a layered structure; and/or (b) baking the sheet to form a biscuit-like structure; and/or (c) setting the sheet in a gel-like matrix.

* * * * *